US008761734B2

(12) United States Patent
Sandegard et al.

(10) Patent No.: US 8,761,734 B2
(45) Date of Patent: Jun. 24, 2014

(54) BUFFERING STREAMING CONTENT (75) Inventors: Anette Sandegard, Malmo (SE);
Per-Anders Hedin, Malmo (SE)

(73) Assignees: Sony Corporation, Tokyo (JP); Sony Mobile Communications AB, Lund (SE)

(*) Notice: Subject to any disclaimer, the term of this patent is extended or adjusted under 35 U.S.C. 154(b) by 1247 days.

(21) Appl. No.: 11/467,778

(22) Filed: Aug. 28, 2006

(65) Prior Publication Data
US 2007/0276917 A1 Nov. 29, 2007

Related U.S. Application Data

(60) Provisional application No. 60/803,180, filed on May 25, 2006.

(51) Int. Cl.
  H04M 3/42 (2006.01)
  H04N 7/16 (2011.01)
  H04B 7/00 (2006.01)

(52) U.S. Cl.
  USPC ............ 455/414.1; 725/62; 370/310

(58) Field of Classification Search
  USPC ............................................. 370/310
  See application file for complete search history.

(56) References Cited

U.S. PATENT DOCUMENTS

| | | | |
|---|---|---|---|
| 5,915,091 A | 6/1999 | Ludwig et al. | |
| 6,466,248 B1* | 10/2002 | Spann et al. | 348/14.08 |
| 2002/0087624 A1* | 7/2002 | Liebenow | 709/203 |
| 2003/0210683 A1* | 11/2003 | Bais et al. | 370/352 |
| 2004/0148353 A1* | 7/2004 | Karaoguz et al. | 709/205 |
| 2004/0179092 A1* | 9/2004 | LaPoint | 348/14.08 |
| 2004/0263631 A1* | 12/2004 | Brittan et al. | 348/207.1 |
| 2005/0132288 A1* | 6/2005 | Kirn et al. | 715/700 |
| 2007/0276917 A1* | 11/2007 | Sandegard et al. | 709/214 |

FOREIGN PATENT DOCUMENTS

| | | |
|---|---|---|
| EP | 1 460 851 | 9/2004 |
| EP | 1 545 129 | 6/2005 |

OTHER PUBLICATIONS

Pering et al., "Face-to-Face Media Sharing Using Wireless Mobile Devices," Multimedia, Seventh IEEE International Symposium in Irvine, CA, USA, Dec. 12-14, 2005, pp. 269-276, XP010870544.
International Search Report for corresponding PCT Application No. PCT/IB2006/054392, dated Jun. 1, 2007.

* cited by examiner

*Primary Examiner* — Christopher M Brandt
*Assistant Examiner* — Muthuswamy Manoharan
(74) *Attorney, Agent, or Firm* — Snyder, Clark, Lesch & Chung, LLP (57) ABSTRACT

A method performed by a mobile terminal may include connecting to a network and transmitting a video data session to other mobile terminals. The video data sessions may be stored in a network server and accessed by the other mobile terminals. The method may also include sending invitations to mobile terminals to receive broadcasted video data sessions.

13 Claims, 7 Drawing Sheets

BUFFERING STREAMING CONTENT

RELATED APPLICATION

This application claims priority under 35 U.S.C. §119 based on U.S. Provisional Application Ser. No. 60/803,180, filed May 25, 2006, the disclosure of which is hereby incorporated herein by reference.

TECHNICAL FIELD OF THE INVENTION

The invention relates generally to communications and, more particularly, to sharing video information.

DESCRIPTION OF RELATED ART

Communication devices, such as cellular telephones, have become increasingly versatile. For example, cellular telephones often include camera features that enable users to obtain video clips of information. At the present time, the camera features employed on cellular telephones are limited by factors such as size and cost. With increased use, applications such as the camera feature have made communication devices increasingly important to users.

SUMMARY

According to one aspect, a method, performed by a first mobile terminal, comprises connecting to a network and transmitting video data to a second mobile terminal. The method also includes simultaneously transmitting the video data to a memory located externally with respect to the first and second mobile terminals.

Additionally, the method may comprise prompting a user to save the video data and retrieving the saved video data at a later time.

Additionally, the method may comprise prompting the user to title the saved video data.

Additionally, the memory located externally with respect to the first and second mobile terminals is a computer associated with a user of the first mobile terminal.

Additionally, the method may comprise accessing a table of saved video data associated with the second mobile terminal.

According to another aspect, a mobile terminal is provided. The mobile terminal comprises a display and logic configured to transmit video data to a second mobile terminal and automatically transmit the video data to a memory located externally from the mobile terminals.

Additionally, the logic may be configured to prompt a user to save the video data and retrieve the saved video data at a later time.

Additionally, the logic may be configured to prompt the user to title the saved video data.

Additionally, the mobile terminal may comprise a transmitter configured to transmit the video data via a wireless network.

Additionally, the logic may be configured to automatically signal the memory to save the video data.

According to a further aspect, a computer-readable medium having stored thereon a plurality of sequences of instructions is provided. The instructions, when executed by at least one processor, cause the processor to connect a mobile terminal to a network and forward video data for transmission to a second mobile terminal. The instructions further cause the processor to simultaneously forward the video data for transmission to a memory located externally from the mobile terminals.

Additionally, the computer-readable medium may further comprise instructions for causing the processor to prompt a user to save the video data and retrieve the saved video data at a later time.

Additionally, the computer-readable medium may further comprise instructions for causing the processor to prompt a user to title the saved video data.

Additionally, the memory located externally from the mobile terminals is a computer associated with a user of the first mobile terminal.

Additionally, the computer-readable medium may further comprise instructions for causing the processor to access a table of saved video data associated with the second mobile terminal in response to an input from a user wherein the table is stored in the memory.

According to another aspect, a method, performed by a first mobile terminal, comprises receiving an invitation to a broadcasted video data session, the broadcasted video data session associated with a second mobile terminal. The method may also comprise accepting the invitation to receive the broadcasted video data session and receiving the broadcasted video data session.

Additionally, the method may comprise displaying the broadcasted video data session on the first mobile terminal.

Additionally, the invitation is sent to the first mobile terminal and a third mobile terminal from a network device.

Additionally, the invitation sent to the first and third mobile terminals is password protected or encrypted.

Additionally, the first and third mobile terminals receive the broadcasted video data session simultaneously.

According to another aspect, a mobile terminal is provided. The mobile terminal comprises a display and logic configured to receive an invitation to a broadcasted video data session, the broadcasted video data session associated with a second mobile terminal. The logic may also be configured to accept the invitation to the broadcasted video data session and receive the broadcasted video data session.

Additionally, the invitation is password protected or encrypted.

Additionally, the mobile terminal may comprise an input device configured to receive an input from a user of a mobile terminal to accept the invitation to receive the broadcasted video data session.

According to another aspect, a network device is provided. The network device comprises a memory and logic configured to receive a video data session from a first mobile terminal and store the video data session in the memory. The logic may also be configured to transmit a video data session to a second mobile terminal. The network device may also include a user interface to forward information identifying a plurality of video data sessions saved in the memory.

Additionally, the user interface is configured to receive a video data selection chosen from a table identifying the plurality of video data sessions saved in the memory, wherein the video data selection is received from the second mobile terminal.

Additionally, the logic may be configured to receive title information relating to a first one of the video data sessions. The title information is associated with the first video data session in memory.

Additionally, the received title information is received from the first mobile terminal.

Other features and advantages of the invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation may represent like elements throughout.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Figure 1:
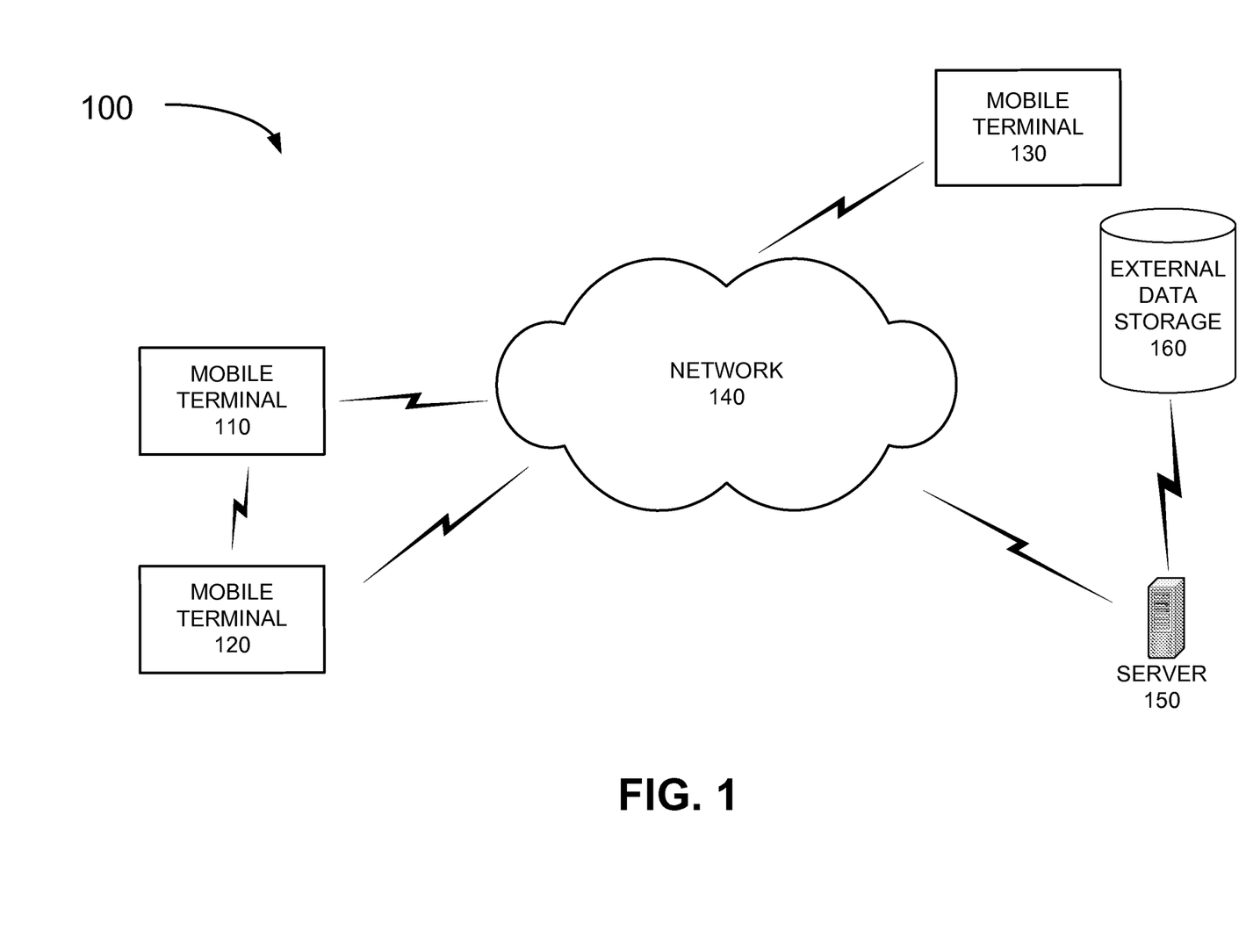
FIG. 1 is a diagram of an exemplary system in which methods and systems consistent with the invention may be implemented.

FIG. 1 is a diagram of an exemplary system 100 in which methods and systems consistent with the invention may be implemented. System 100 may include mobile terminals 110, 120 and 130, server 150 and external memory 160, connected via network 140. Only three mobile terminals are shown for simplicity. It should be understood that system 100 may include other numbers of mobile terminals, servers and external memories.

The invention is described herein in the context of a mobile terminal. As used herein, the term "mobile terminal" may include a cellular radiotelephone with or without a multi-line display; a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices that are capable of communicating with other devices such as other mobile terminals via IMS protocols (IP Multimedia Subsystem) or other protocols that allow for simultaneous communications of voice, data, and video information.

Network 140 may include one or more networks including a cellular network, a satellite network, the Internet, a telephone network, such as the Public Switched Telephone Network (PSTN), a metropolitan area network (MAN), a wide area network (WAN), a local area network (LAN). Mobile terminals 110, 120 and 130 may communicate with each other over network 140 via wired, wireless or optical connections.

In an exemplary implementation, network 140 includes a cellular network used for transmitting data to and from mobile terminals 110-130, server 150 and/or external memory 160. Such components may include base station antennas (not shown) that transmit and receive data from mobile terminals within their vicinity. Such components may also include base stations (not shown) that connect to the base station antennas and communicate with other devices, such as switches and routers (not shown) in accordance with known techniques.

Server 150 may include one or more processors or microprocessors enabled by software programs to perform conventional functions, such as data storage and transmission, codex conversion, and interfacing with other servers (not shown) and mobile terminals 110-130, for example. External data storage memory 160 may include a random access memory (RAM) or another dynamic storage device that stores information such as video information, as described in detail below. In some implementations, data storage 160 may be part of server 150.

Server 150 may also include a communication interface that may include any transceiver-like mechanism that enables server 150 to communicate with other devices and/or systems. For example, server 150 may include a modem or an Ethernet interface to a LAN. In addition, server 150 may include other mechanisms for communicating data and video data via a network, such as a wireless network. For example, server 150 may include one or more radio frequency (RF) transmitters and receivers and an antennas for transmitting and receiving (RF) signals.

Figure 2:
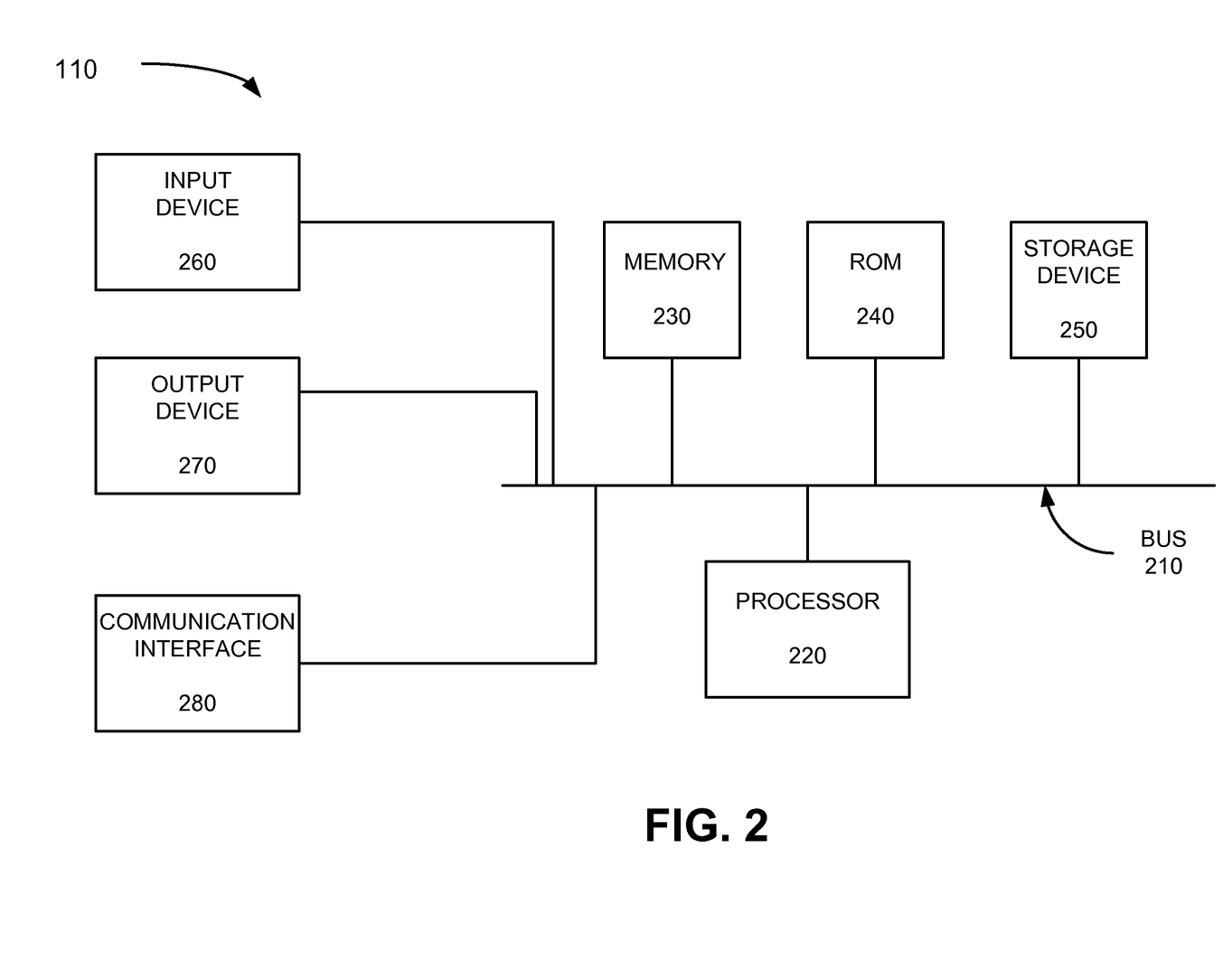
FIG. 2 is a diagram of an exemplary mobile terminal according to an implementation consistent with the invention.

FIG. 2 is a diagram of an exemplary configuration of a mobile terminal 110 consistent with the invention. It should be understood that mobile terminals 120 and 130 may include the same or similar elements and may be configured in the same or a similar manner. Server 150 may also include the same or similar elements.

Mobile terminal 110 may include bus 210, processor 220, a memory 230, a read only memory (ROM) 240, a storage device 250, an input device 260, an output device 270, and a communication interface 280. Bus 210 permits communication among the components of mobile terminal 110. Mobile terminal 110 may also include one or more power supplies (not shown). One skilled in the art would recognize that mobile terminal 110 may be configured in a number of other ways and may include other or different elements.

Processor 220 may include any type of processor or microprocessor that interprets and executes instructions. Processor 220 may also include logic that is able to decode media files, such as audio files, video files, etc., and generate output to, for example, a speaker, a display, etc. Memory 230 may include a random access memory (RAM) or another dynamic storage device that stores information and instructions for execution by processor 220. Memory 230 may also be used to store temporary variables or other intermediate information during execution of instructions by processor 220.

ROM 240 may include a conventional ROM device and/or another static storage device that stores static information and instructions for processor 220. Storage device 250 may include a magnetic disk or optical disk and its corresponding drive and/or some other type of magnetic or optical recording medium and its corresponding drive for storing information and instructions. Storage device 250 may also include a flash memory (e.g., an electrically erasable programmable read only memory (EEPROM)) device for storing information and instructions.

Input device 260 may include one or more conventional mechanisms that permit a user to input information to mobile terminal 110, such as a keypad for a telephone, a microphone, a pen, voice recognition and/or biometric mechanisms, etc. Output device 270 may include one or more conventional mechanisms that output information to the user, including a display, a printer, one or more speakers, etc. Communication interface 280 may include any transceiver-like mechanism that enables mobile terminal 110 to communicate with other devices and/or systems. For example, communication interface 280 may include a modem or an Ethernet interface to a LAN. In addition, communication interface 280 may include other mechanisms for communicating via a network, such as a wireless network. For example, communication interface 280 may include one or more radio frequency (RF) transmitters and receivers and an antennas for transmitting and receiving (RF) signals.

According to an exemplary implementation, mobile terminal 110 may perform various processes in response to processor 220 executing sequences of instructions contained in memory 230. Such instructions may be read into memory 230 from another computer-readable medium, such as storage device 250, or from a separate device via communication interface 280. It should be understood that a computer-readable medium may include one or more memory devices or carrier waves. Execution of the sequences of instructions contained in memory 230 causes processor 220 to perform the acts that will be described hereafter. In alternative embodiments, hard-wired circuitry may be used in place of or in combination with software instructions to implement aspects of the present invention. Thus, the invention is not limited to any specific combination of hardware circuitry and software.

Figure 3:
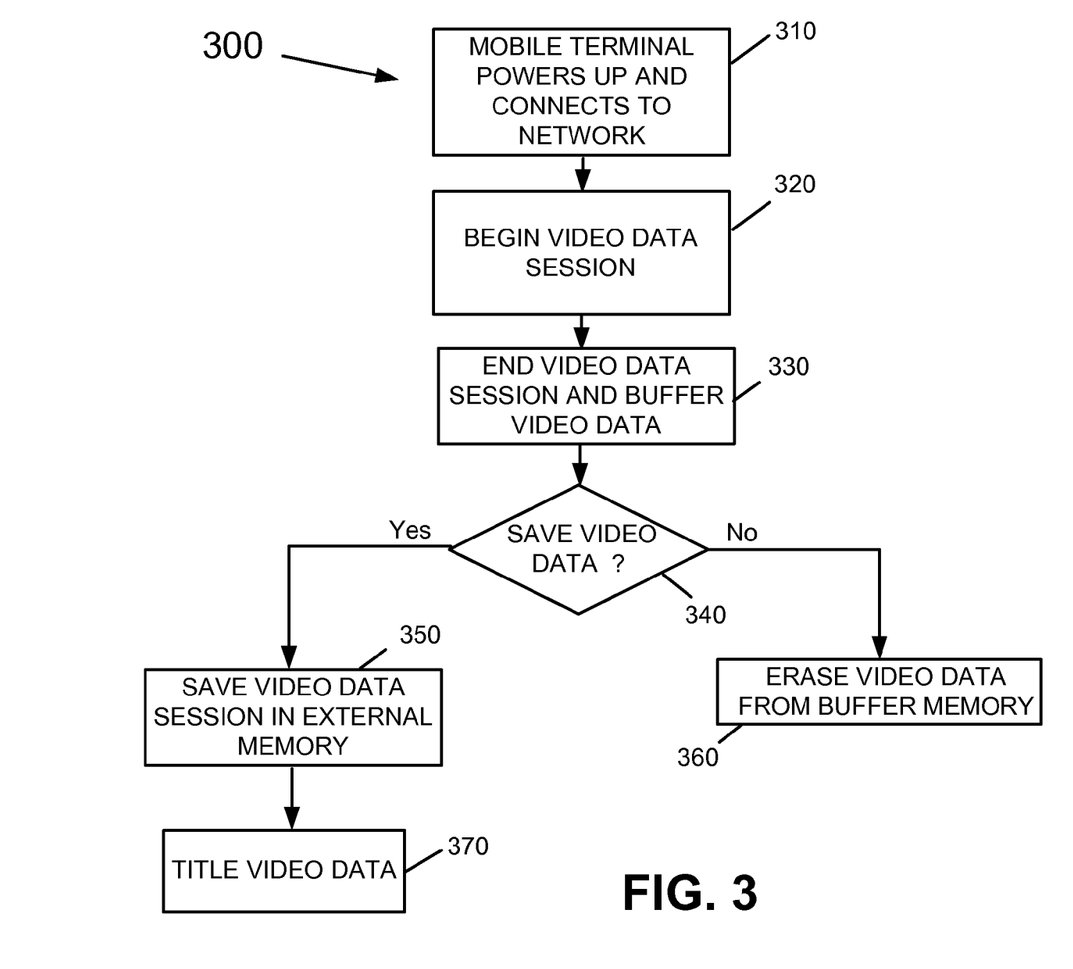
FIG. 3 is a flow diagram illustrating exemplary processing by mobile terminals consistent with the invention.

FIG. 3 is a flow diagram illustrating exemplary processing 300 by mobile terminals, such as one or more of mobile terminals 110-130, in an implementation consistent with the invention. Processing may begin when a mobile terminal, such as mobile terminal 110, powers up and connects to the network 140 (act 310). Once connected to the network 140, a mobile terminal 110-130 may receive or initiate a call to another mobile terminal via network 140. Using a multimedia protocol, such as an Internet protocol multimedia subsystem (IMS) protocol for example, a call from a mobile terminal 110-130 to another mobile terminal, or to a server 150 connected to network 140, may simultaneously include voice, data and video data information. Once connected to the network 140, a user may initiate or receive a call using for example, input device 260, output device 270 and/or communication interface 280 (FIG. 2), which may include pressing one or more control buttons or keypad inputs on mobile terminal 110. During a call, a user may initiate sending or begin receiving a video data transmission or session on mobile terminal 110 (act 320). For example, assume that the user of the mobile terminal 110 begins using the camera feature to record a video clip while skiing down a mountain in Aspen. Using the keypad within input device 260, the user of mobile terminal 110 while skiing down a mountain, may transmit this video data session or clip to a user of a mobile terminal 120 who is in Rome having coffee. Likewise, the user of mobile terminal 120 in Rome may begin streaming a video data session to the user of mobile terminal 110 in Aspen, for example.

In one implementation consistent with the present invention, the video data session transmitted from one mobile terminal to another, may be simultaneously transmitted to a server 150. In this implementation, mobile terminal 110 may be configured to automatically transmit video data to an external memory such as server 150 and/or storage 160 without input from the user of the mobile terminal 110. In this implementation, server 150 may include a buffer memory to store the video data session. When the video data session has ended, the video data may be stored in the buffer memory in server 150 (act 330). In other exemplary embodiments, the video data session may be transmitted from mobile terminal 110 directly to external memory 160.

After the video data session is over, a user of mobile terminal 110 may be prompted to permanently save the video data session (act 340). For example, the user may be automatically prompted to save the video data session by a notification displayed via output device 270 (FIG. 2) of mobile terminal 110. An exemplary prompt or query to the user may include a text display such as "Do you want to permanently save the video session?" or "Save streamed content to your personal server?" Using the input device 260 (FIG. 2), a user may choose or select whether to permanently store the video data in response to the prompt (act 340). If the user chooses to save the video data (Yes), the video data session is saved in, for example, external data storage 160 (act 350). If the user does not choose to save the video data session, (No) the contents of the buffer memory are erased (act 360). In another embodiment consistent with the invention, the act (340) of prompting the user may be replaced with a default setting that automatically saves video data sessions received by server 150 in server 150 and/or external data storage 160.

Figure 4:
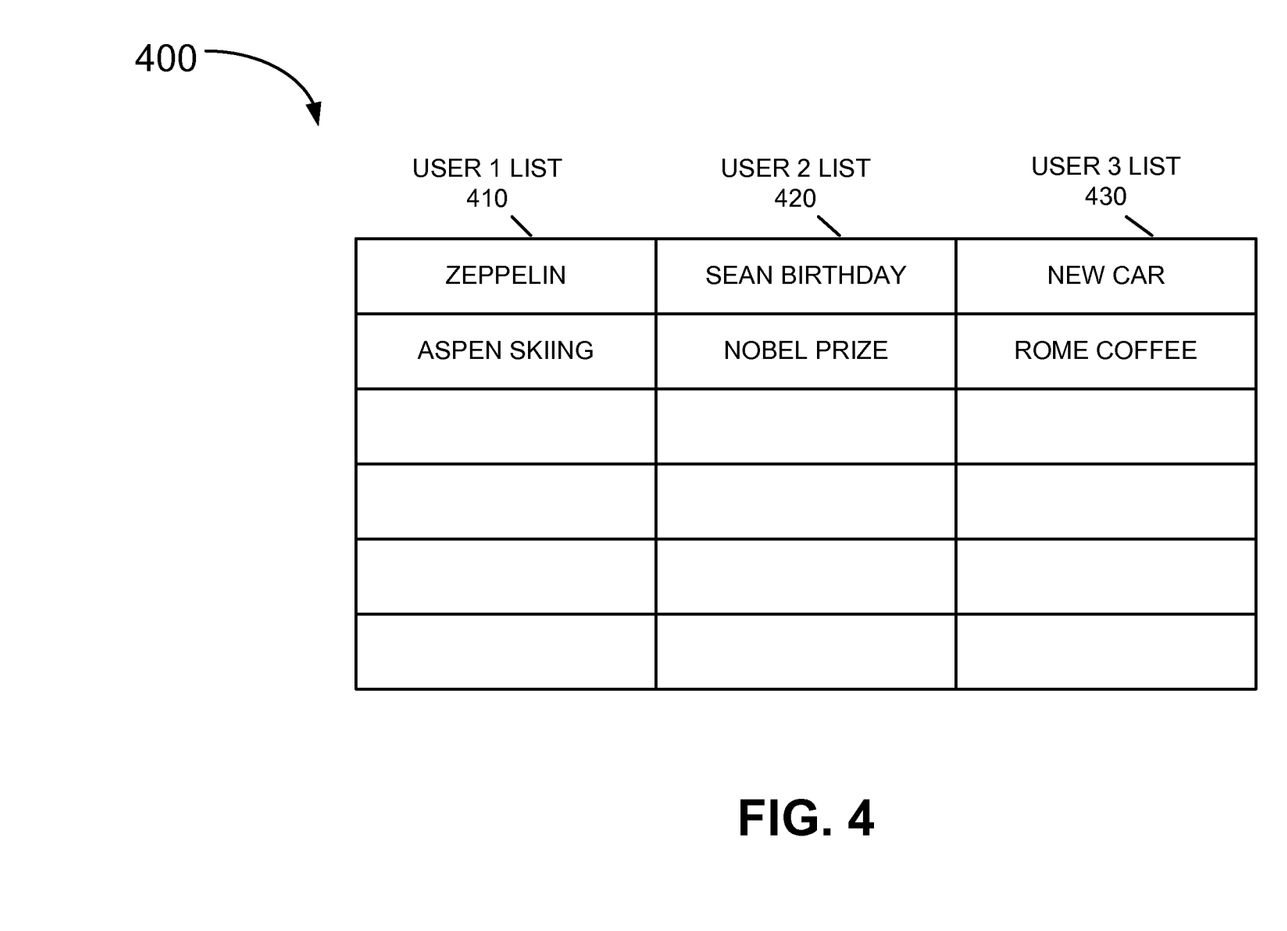
FIG. 4 is a block diagram illustrating a table stored in a network device according to an exemplary implementation.

If the user of mobile terminal 110 elects to not save the video data, a user may return to or resume other operations, such as making new calls via mobile terminal 110. If the user has elected to permanently save the video data (act 350), the user may be further prompted to identify or title the video data (act 370). Once titled, the video data may be stored and accessed by the user of mobile terminal 110 at a later time. As will be described further, the titled video data may also be accessed by users of other mobile terminals, such as mobile terminals 120 and 130 for example. In an exemplary implementation, the server 150 may store the information in table form, for example, as shown in FIG. 4. In addition to storing video data in a server memory, alternative embodiments of the invention allow a user to save video data in memory 250 of mobile terminal 110. In still another implementation, a user may save video data in a personal computer, such as the user's home personal computer.

FIG. 4 illustrates an exemplary table 400 used to store video data sessions in external data storage 160. Referring to FIG. 4, table 400 may include a User 1 List 410, a User 2 List 420 and a User 3 List 430. The user lists 410-430 may correspond to users of mobile terminals 110, 120 and 130, respectively. After connecting to the network 140, a user may access table 400. For example, one or more elements in the network 140 or server 150 may automatically recognize a particular mobile terminal and grant access to the table 400. Alternatively, a password may be required to gain access to the table 400. In an exemplary embodiment consistent with the invention, a user of the mobile terminal 110 may also access other user's lists, for example list 420 and list 430. Another user's list may be accessed by using a password, or the lists 410-430 may be stored in the network 140 in a manner where each list is available to all users of the system.

In this exemplary embodiment, the User 1 list 410 may store video data of a Led Zeppelin reunion concert that has been titled "Zeppelin" and a video data session taken while skiing in Aspen titled "Aspen Skiing." These video data sessions may be saved and titled as described above with respect to FIG. 3.

User 2 list 420 shows video data sessions "Sean Birthday" and "Nobel Prize". User 3 list 430 includes a "New Car" video data session and a "Rome Coffee" video session as saved and titled by a user. The user of mobile terminal 110 may also set one or more types of information relating to the video data, via input device 260. For example, in one implementation, mobile terminal 110 may provide a menu that lists a number of options with respect to storing the video data and information relating to the video data. The user may then store video data based on their particular preferences. For example, a "personal favorites" list, a "kids videos" list, or a "videos today" list may be created and stored in the system by a user of mobile terminal 110.

User lists 410-430 illustrated in FIG. 4 are exemplary only. It should be understood that table 400 may include additional fields associated with the video data information based on the particular user's preferences. For example, table 400 may include a favorites list or table that identifies video data sessions that are frequently being accessed by users, such as users associated with mobile terminals 110-130.

Figure 5:
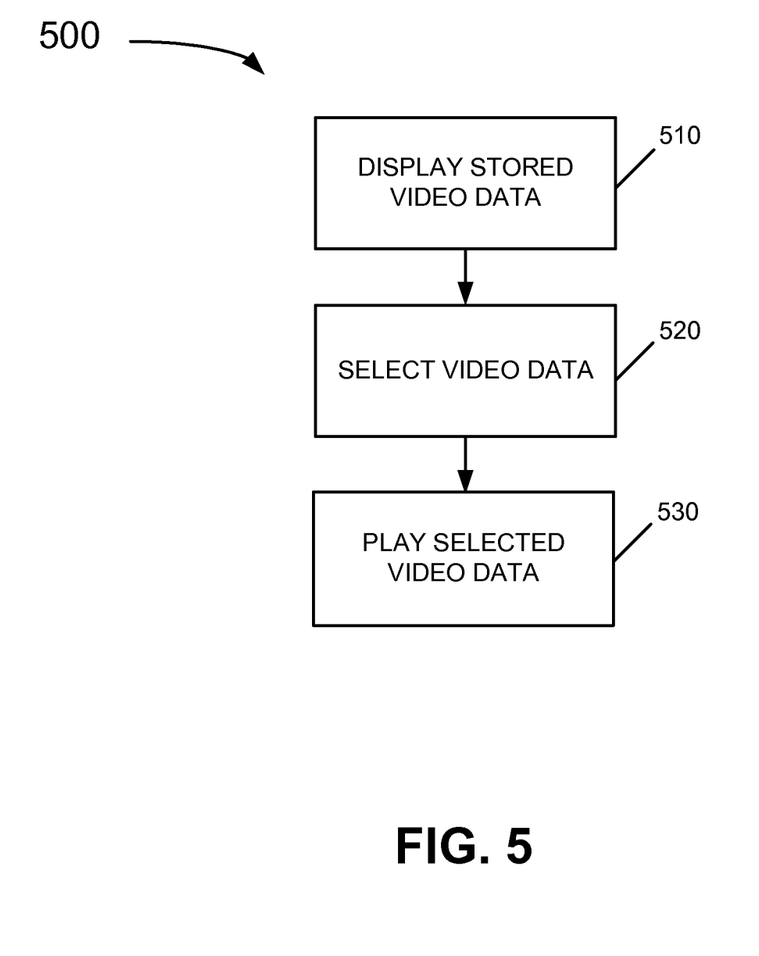
FIG. 5 is a flow diagram illustrating exemplary processing by a mobile terminal consistent with the invention.

FIG. 5 is a flow diagram 500 illustrating exemplary processing by mobile terminal 110 associated with displaying the stored video data sessions and selecting and playing the video data sessions. Mobile terminal 110, consistent with the invention, may allow the user of mobile terminal 110 to view the video data identification or title information stored in table 400, via output device 270. For example the user of mobile terminal 110 may access server 150 and server 150 may transmit table 400 to mobile terminal 110. Output device 270 may also display only one user list 410-430 at a time, via a display screen.

In one exemplary embodiment consistent with the invention, the user of mobile terminal 110 may display the information stored in table 400, such as the information in User 2 List 420 (act 510). For example, "Sean Birthday" and "Nobel Prize" would be displayed in a table via output device 270. Using the input device 260, the user of mobile terminal 110 may press one or more function keys or keys on a keypad of mobile terminal 110 to display the lists of the stored video data sessions. In this manner, the user of mobile terminal 110 may browse through a listing of all the stored video data sessions. Again using the input device 260, the user of mobile terminal 110 may press one or more function keys or keys on a keypad of mobile terminal 110 to select a video data session from the displayed lists (act 520). Once a particular video data session has been selected, that video data session is transmitted to and then played by displaying the session on the display of a mobile terminal 110 (act 530). In another embodiment consistent with the invention, the selected video data session may be transmitted and downloaded from server 150 and/or data storage 160 to the storage device 250 within mobile terminal 110. The selected video data session may then be displayed at a later time by the user of mobile terminal 110.

In still further alternatives, mobile terminal 110 and mobile terminal 120 may execute an application that allows theses mobile terminals to transfer video data files between themselves in a peer-to-peer manner that allows the video data files to be displayed at a later time. In each case, mobile terminal 110 may receive the desired video data session and then play the selected session (act 530). When the video data session is finished playing, a user of a mobile terminal 110 may select and display another video data session or perform other operations on the terminal 110.

Figure 6:
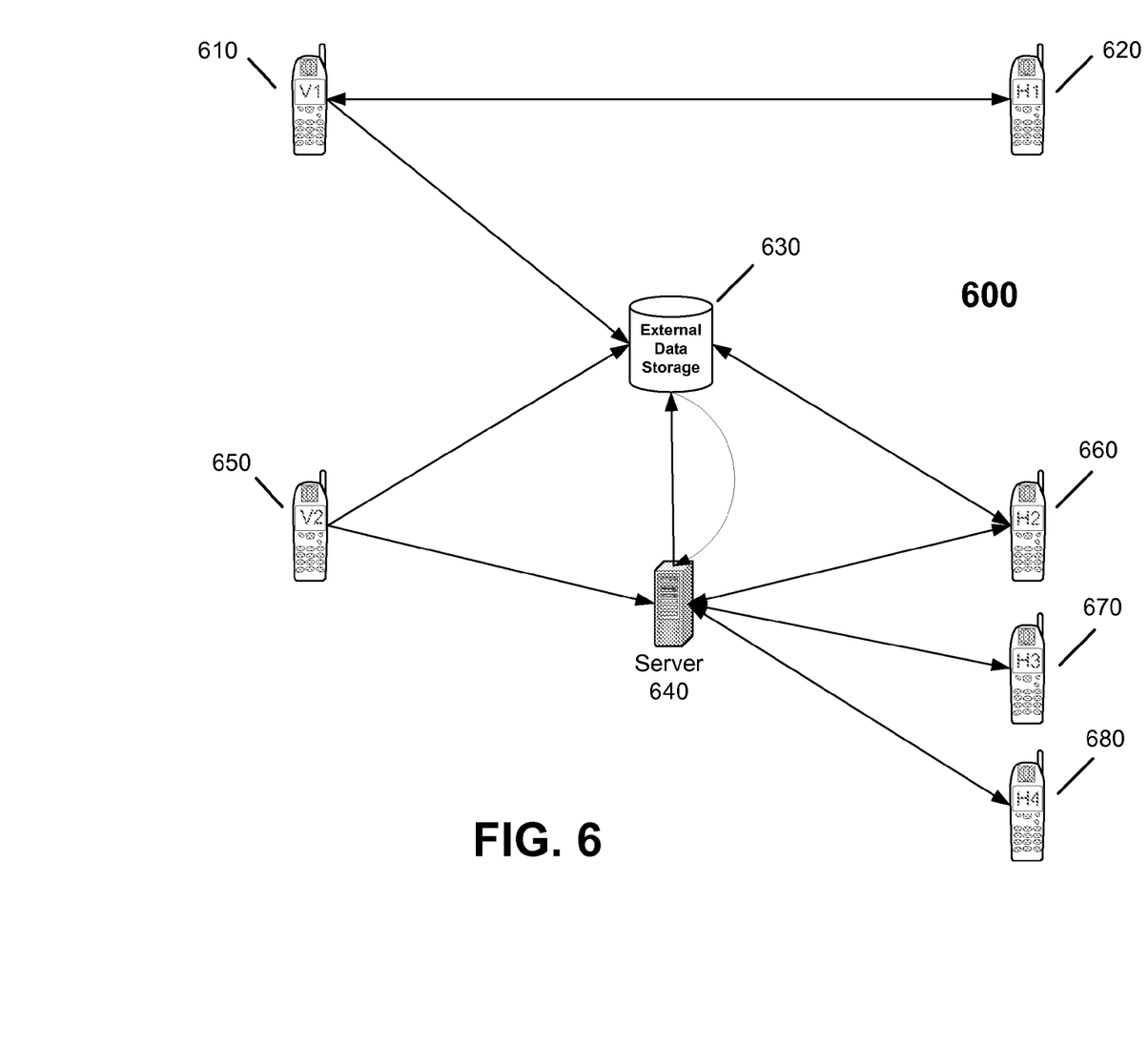
FIG. 6 is a diagram of an exemplary system in which methods and systems consistent with the invention may be implemented.

FIG. 6 shows another exemplary communications system 600 in which methods and systems consistent with the invention may be implemented. Referring to FIG. 6, exemplary system 600 includes mobile terminals 610, 620, 650, 660, 670 and 680, that may communicate with each other via system 600. System 600 also may include external data storage device 630 and a server 640. System 600 also may include a cellular network that uses components for transmitting data to and from mobile terminals 610-620 and 650-680, server 640 and external memory 630. For example, system 600 may include base station antennas (not shown) that transmit and receive data from mobile terminals within their vicinity. System 600 may also include base stations (not shown) that connect to the base station antennas and communicate with other devices, such as switches and routers (not shown) in accordance with known techniques. System 600 may also communicate using various other forms of communication as previously described with reference to system 100 in FIG. 1. Mobile terminals 610-620 and 650-680 may also be configured as shown above with reference to FIG. 2. Server 640 and external memory 630 may also be configured in a manner similar to server 150 and data storage 160 as described above with reference to FIG. 1. In an exemplary implementation, mobile terminal 610 may share information using a peer-to-peer video data session with mobile terminal 620. Simultaneously during this peer-to-peer video data transmission session, the video data may be transmitted to a buffer memory in external storage device 630. In some implementations, external data storage 630 may be a home computer or server associated with the user of mobile terminal 610. The external storage device 630 may also be connected to a server 640. Using a multi-media protocol, such as an IMS protocol, it is also possible to set up "end-to-end" video data sessions between mobile terminal 610 and mobile terminal 620 that allow for a more effective data transfer.

In another implementation, mobile terminal 650 may transmit video data directly to server 640. The server 640 may then simultaneously transmit the video data session to the external storage 630 and to another mobile terminal. In this example, mobile terminal 660 may receive the video data session at substantially the same time server 640 is receiving the video data session from mobile terminal 650. Once a video data transmission session is stored on the server 640 or external memory 630, methods of accessing these video data sessions, such as those described in FIGS. 4-5 may be performed by any mobile terminal in communication system 600.

In still another implementation, mobile terminal 650 may transmit or stream video data directly to a server 640. At a later time, mobile terminals 660, 670 and 680 may receive an invitation from the server 640 to receive the video data session from the server 640 or access video data storage through a user interface on server 640 to allow users to view available video data sessions, as described in detail below. Similarly, the server 640 may also transmit the video data to the external storage 630 at some later time or immediately upon receiving the video data.

Figure 7:
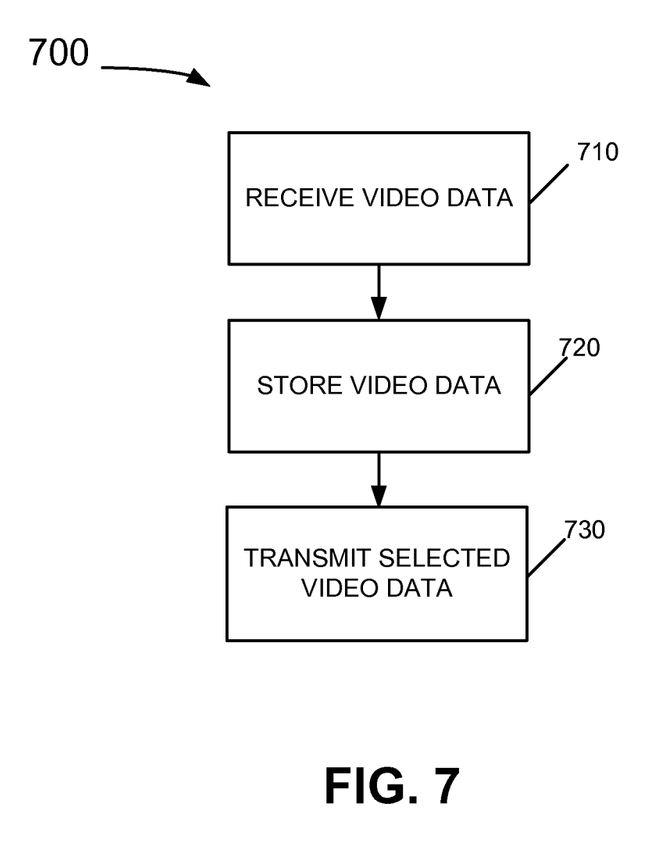
FIG. 7 is a flow diagram illustrating exemplary processing by a network device consistent with the invention.

FIG. 7 illustrates exemplary processing 700 that may be performed by a network device consistent with the invention. Processing may begin with mobile terminals 610-620 or 650-680 transmitting video data sessions to server 640 (act 710). As discussed above with reference to FIG. 6, the video data session may be transmitted directly from a mobile terminal 610 to server 640, or may be transmitted from one mobile terminal to another while being simultaneously transmitted to server 640. In this embodiment, server 640 may include a buffer memory to store the video data session. When the video data transmission has ended, the video data is stored in a buffer memory of server 640 (act 720). As discussed above with reference to FIG. 4, once the video data is stored in the memory of server 640, a user may title the video. In this manner, video data is maintained in server 640 for users of mobile terminals. A user of a mobile terminal 610 may then select a stored video data session to be transmitted to their personal mobile terminal (act 730). In this example, the video data transmitted to the user of mobile terminal 620 may have been saved in the system by, for example, the user of mobile terminal 610.

In another embodiment consistent with the invention, server 640 may send an invitation to specific mobile terminals to receive a broadcast of a selected video data session. For example, mobile terminals 660-680 may receive an invitation to receive a selected video clip that will be broadcast from server 640 at 5 PM that day. Upon receiving the invitation from server 640, a mobile terminal 650-680 can accept or decline the invitation. The responses to the invitations are transmitted from mobile terminals 660-680 back to the server 640. The received responses determine which mobile terminals 660-680 will receive the broadcasted video data. For example, mobile terminal 660 may decline to receive the broadcast, while mobile terminals 670 and 680 respond affirmatively to the invitation. In this example, mobile terminals 670 and 680 will begin receiving the broadcasted video data session at 5 PM that day from the network device server 640. The broadcasted video data sessions will be directed to only mobile terminals 670 and 680 in this example.

In still further embodiments consistent with the invention, server 640 may send an encrypted or password protected invitation to specific mobile terminals to receive a broadcast of a selected video data session. For example, mobile terminals 660-680 may receive an encrypted or password protected invitation to receive a selected video clip. Mobile terminals 660-680 may then receive a decryption key or password needed to open and respond to the invitation sent from server 640. Upon opening the invitation from server 640, a mobile terminal 650-680 can accept or decline the invitation. The responses to the invitations are transmitted from mobile terminals 660-680 back to the server 640. The received responses may also be encrypted and/or password protected. These responses determine which mobile terminals 660-680 will receive the broadcasted video data from server 640. For example, mobile terminal 660 may decline to receive the broadcast, while mobile terminals 670 and 680 respond affirmatively to the invitation. In this example, only server 640 will transmit the video data to only mobile terminals 670 and 680.

CONCLUSION

Implementations consistent with the invention allow users to share and save video data sessions. This greatly enhances the capabilities of mobile terminals with respect to playing video data. In addition, aspects consistent with the invention enable a user to save and/or share video data sessions in a manner that requires little to no input by the user. This helps increase a user's satisfaction level with respect to sharing and storing video information.

The foregoing description of the embodiments of the invention provides illustration and description, but is not intended to be exhaustive or to limit the invention to the precise form disclosed. Modifications and variations are possible in light of the above teachings or may be acquired from practice of the invention.

For example, the invention has been described in the context of a mobile terminal sharing video data transmissions and information. In addition, the invention has been described as being implemented by mobile terminals connected via a communications network. The invention may be implemented in other devices or systems and/or networks. For example, the network devices may connect to each other using Bluetooth or some other relatively short range connection mechanism. This may help limit the amount of information that a user receives in situations where the user does not want to receive a large amount of information. In still other alternatives, the network devices may connect to each other over a LAN, a virtual LAN (VLAN), a WAN, a intranet, the Internet, a PSTN, etc. The invention may also be implemented by any network device, including a non-mobile device that is able to connect to a network.

Further, while series of acts have been described with respect to FIGS. 3, 5 and 7, the order of the acts may be varied in other implementations consistent with the invention. Moreover, non-dependent acts may be performed in parallel.

It will also be apparent to one of ordinary skill in the art that aspects of the invention, as described above, may be implemented in cellular communication devices/systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as a processor, a microprocessor, an application specific integrated circuit or a field programmable gate array, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A non-transitory computer-readable medium having stored thereon a plurality of sequences of instructions which, when executed by at least one processor, cause the processor to:

connect a first mobile terminal to a cellular network;
set up, through the cellular network, a first peer-to-peer video data session between the first mobile terminal and a second mobile terminal using a multi-media protocol to forward video data from the first mobile terminal to the second mobile terminal, where the first peer-to-peer video data session allows video sharing without a centralized or an intermediary coordinator;
set up, through the cellular network, a second peer-to-peer video data session between the first mobile terminal and a server, where, simultaneously with the first mobile terminal forwarding the video data to the second mobile terminal in the first peer-to-peer video data session, the video data is forwarded, over the cellular network via the second peer-to-peer video data session using the multi-media protocol, from the first mobile terminal to the server, where the second peer-to-peer video data session allows video sharing without a centralized or an intermediary coordinator, and where the server stores the video data in a memory and where the server does not participate in the first peer-to-peer video data session; and
forward, to at least one of one or more third mobile terminals, an invitation from the server to access the video data stored in the memory,
where the memory is located externally from the first mobile terminal, the second mobile terminal, and the one or more third mobile terminals.

2. The non-transitory computer-readable medium of claim 1, where the
sequence of instructions, when causing the processor to set up the first peer-to-peer video data session, is further to:
prompt a user, associated with one of the first mobile terminal or the second mobile terminal, to provide an input to store the video data, where setting up the second peer-to-peer video data session is in response to the provided input.

3. The non-transitory computer-readable medium of claim 2, further comprising instructions to cause the processor to:
prompt the user to provide a title for the stored video data.

4. The computer-readable medium of claim 1, where the sequence of instructions further cause the processor to:
instruct the server to save the video data to a personal computer associated with a user of the first mobile terminal.

5. A method implemented by a first mobile terminal, the method comprising:
establishing a first peer-to-peer video data session, between the first mobile terminal and a second mobile terminal using a multi-media protocol to forward video data from the first mobile terminal to the second mobile terminal; and
establishing a second peer-to-peer video data session between the first mobile terminal and a server device using the multi-media protocol, where the first mobile terminal, when forwarding the video data via, the first peer-to-peer video data session, simultaneously forwards the video data, via the second peer-to-peer video data session, directly to the server device, where the first and the second peer-to-peer video data sessions allow video sharing without a centralized or an intermediary coordinator, and where the server device does not participate in the first peer-to-peer video data session,
where the server device stores the video data in a memory, transmits an invitation to receive a broadcast of the stored video data to at least one of one or more third mobile terminals, receives a response from the at least one of the one or more third mobile terminals accepting the invitation, and transmits the stored video data to the at least one of the one or more third mobile terminals.

6. The method of claim 5, further comprising:
transmitting an invitation to receive a broadcast of the stored video data to another of the one or more third mobile terminals.

7. The method of claim 5, further comprising:
receiving a response from the other of the one or more third mobile terminals accepting the invitation.

8. The method of claim 5, where the video data is saved to a personal computer associated with a user of the first mobile terminal.

9. A server, comprising:
a memory; and
a processor to:
receive, via a first peer-to-peer video data session, video data from a first mobile terminal, where the first mobile terminal is engaged in a second peer-to-peer video data session with a second mobile terminal using a multi-media protocol to forward the video data from the first mobile terminal to the second mobile terminal, where the first mobile terminal simultaneously forwards the video data, respectively via the first peer-to-peer video data session and the second peer-to-peer video data session, to the server and to the second mobile terminal, where the first and second peer-to-peer video data sessions allow video sharing without centralized or intermediary control, and where the server does not participate in the second peer-to-peer video data session,
store the video data session in the memory,
transmit an invitation to receive a broadcast of the stored video data session to at least one of one or more third mobile terminals,
receive a response from the at least one of the one or more third mobile terminals accepting the invitation, and
transmit the stored video data session to the at least one of the one or more third mobile terminals.

10. The server of claim 9, where the processor is further to:
transmit the invitation to receive a broadcast of the stored video data session to another of the one or more third mobile terminals.

11. The server of claim 10, where the processor is further to:
receive a response from the other of the one or more third mobile terminals accepting the invitation.

12. The server of claim 11, where the processor is further to:
transmit, in response to the receiving the response, the video data session to the other of the one or more third mobile terminals.

13. The server of claim 11, where the processor is further to save the video data to a personal computer associated with a user of the first mobile terminal.

* * * * *